Sept. 29, 1953     T. F. MacARTHUR     2,653,485

SILENT CHAIN

Filed July 20, 1950

INVENTOR
Thomas F MacArthur
BY
Pennie Edmonds Morton & Barrows
ATTORNEY

Patented Sept. 29, 1953

2,653,485

UNITED STATES PATENT OFFICE 2,653,485

SILENT CHAIN

Thomas F. MacArthur, Troy, N. Y., assignor to Ramsey Chain Company, Inc., Albany, N. Y., a corporation of New York Application July 20, 1950, Serial No. 174,885

6 Claims. (Cl. 74—253)

This invention relates to silent chain for power transmission, and particularly to an improvement in silent chain of the type described in the patent to J. H. Ramsey, 1,488,710.

Silent chain as described in the patent has been manufactured for many years and is in general use. This chain and chains of similar type are capable of flexing in both directions so that the run of chain between the sprockets has a tendency to sag or flex backward or to "whip." This action is undesirable for various reasons. Various methods of eliminating "whip" have been heretofore advanced, but these have entailed complicated structures. This invention presents a simple construction, taking advantage of the inherent and proven features of the roller bearing type joint, to avoid sagging of silent chain between the sprockets.

It is the object of the present invention to provide an improved chain which is constrained to move in a straight line between the sprockets by its internal construction, thereby avoiding reverse flexing or "whipping" of the chain without interfering with the normal flexing of the chain as it passes around the sprockets.

Other objects and advantages of the invention will be apparent as it is better understood by reference to the following specification and the accompanying drawing, in which Fig. 1 is a view in perspective of a center guide chain embodying the invention;

Silent chain of the type referred to consists of a plurality of links assembled in overlapping relation and articulated by two-part pintles having arcuate faces in engagement so that the parts of the pintles rock or roll upon each other as the chain flexes. The opposite faces of the pintle parts are flattened for engagement with the walls of the apertures in the links. In the chain as described in the Ramsey patent, the structure is designed for 30° of articulation between adjacent links to permit the chain to travel about the sprocket and 10° of articulation in the reverse direction. As hereinbefore indicated, this permits the chain to sag and to "whip" between the sprockets.

The present invention overcomes the disadvantage of reverse articulation by employing special links parallel to the regular links. Such special links may be in the form of guide links and may be disposed in the center of the chain or at the sides thereof. The special links, instead of having apertures corresponding to those in the regular links, are modified by providing projecting inside edges in the apertures instead of the edges of circular contour which characterize the apertures in the other links. The edges of these projections are opposite the flattened edges or walls of the apertures of the links and are closer to the centers of the apertures than the arcs, or arcuate portions, of the apertures. Such projecting inside edges, or projections, are preferably convex. They do not limit the flexing of the chain as it passes over the sprocket, but when the chain leaves the sprocket the projecting edges engage the pintle parts and prevent reverse flexing of the chain, which consequently travels in a straight line, each set of links being held in the desired position until the chain again engages a sprocket and passes around it in the usual manner with the full degree of flexing required for that purpose. Since the chain cannot sag between the sprockets, "whipping" is completely prevented.

Figure 3:
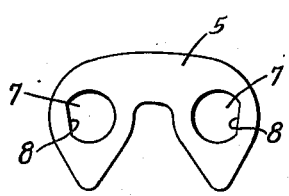
Fig. 3 is a side view of a plain link in the chain.

Referring to the drawing, 5 indicates a link of the chain which, as indicated in Fig. 3, has the accepted external outline and is provided with two apertures 7 which are generally circular in form except for the flattened edges 8. The links are preferably assembled in alternately overlapping manner with the apertures at the ends of a group of links registering with the corresponding apertures in the opposite ends of another group of links. The pintle parts 10 and 11 are then inserted to provide the desired articulation. The pintle part 11 is somewhat shorter than the pintle part 10. Both parts have convex surfaces 12 adapted for rolling contact, the radii of the two surfaces being preferably identical and substantially equal to three-fifths of the chain pitch. Each of the pintle parts has also flattened faces 13 adapted to cooperate with the corresponding flattened edges of the apertures in the particular set of links against which the pintle part rests. The two edges of each of the pintle parts are preferably provided with curved surfaces, the radii of which are the same as those of the apertures, the pintles being of sufficient thickness to provide a slight clearance. The clearance required is, however, usually very slight, being preferably only sufficient to ensure against rubbing contact between the pintle parts and the edges of the apertures. The pintle parts being of the same thickness at both edges as shown in the drawings, the flattened edges of the apertures in the links are so disposed as to give the pintle parts a relative tilt of preferably about 10° to each other when the chain is straight if the chain is to be used with other than very large sprockets.

In completing the chain, side plates 14 are provided with apertures 15 shapd to receive the ends of only one of each pair of pintle parts. The pintle parts which extend through the side links may be secured in any desired manner. For example, they may be flanged at one end and adapted to be secured by battering the end or swaging, or the ends which do not have flanges may be provided with openings to receive cotter pins. Any other method of securing the pintle parts is suitable. It will be noted that the shorter pintle part of each pair does not extend through the side links but is held in place by these links. The structure as hereinbefore described is that of silent chain such as has been manufactured and used for many years.

Figure 1:
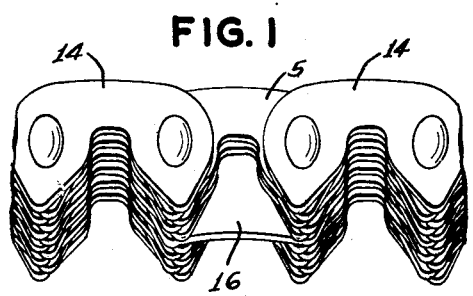
Figure 2:
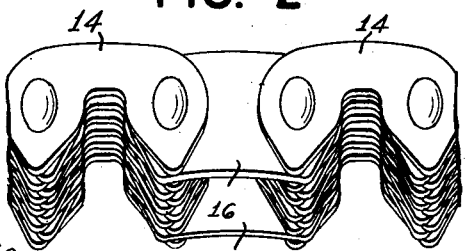
Fig. 2 is a view in perspective of a modification of the chain using side guides.

In order to carry out the purpose of the present invention, the chain is provided with guide links 16 introduced between alternate sets of pintles as shown in Figs. 1 and 2. As shown in Fig. 1, the guide links 16 may be disposed medially of the chain width. In Fig. 2, the guide links are disposed at the sides of the chain and secured behind the side links 14.

Figure 6A:
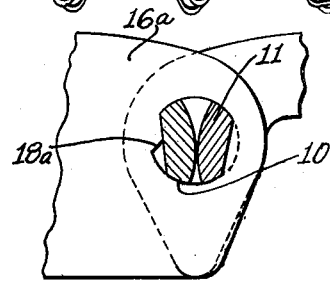
Fig. 6a is a fragmentary view of a portion of Fig. 6 drawn to an enlarged scale and showing a modification.
Figure 6:
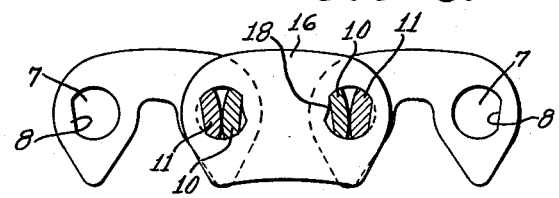
Fig. 6 is a sectional view of a portion of the chain in straight position.
Figure 4:
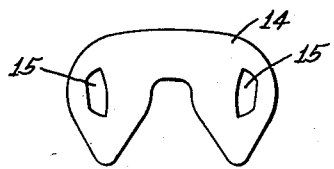
Fig. 4 is a side view of one of the side links.
Figure 7:
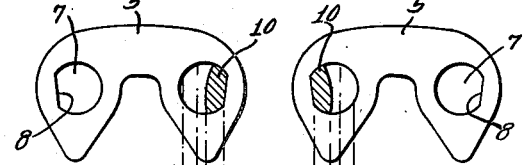
Fig. 7 is an exploded view of the chain elements.
Figure 5:
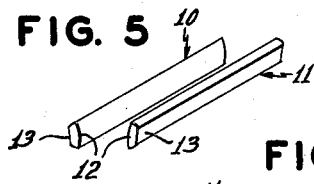
Fig. 5 is a view in perspective of the long and short pintles employed in articulating the chain.
Figure 8:
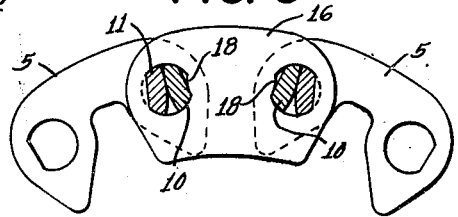
Fig. 8 is a sectional view of the chain flexed to pass around a sprocket.

Referring to Figs. 6–8, inclusive, it will be seen that the guide links 16 have apertures 17 which are generally similar to the apertures in the links 5, but differing therefrom by the provision of convex edges 18. An angular projection such, for example, as the projection 18a shown in Fig. 6a, may be employed in place of the convex edge, it being necessary merely to provide a stop which will prevent reverse flexing of the chain. It will be understood from Fig. 6a that projection 18a consists of two flat surfaces of equal length meeting at an apex, but any other form of projection may be employed, the edge of which is closer to the center of aperture 17 than the circumference or arc of this aperture.

When the chain is in straight line position, as shown in Fig. 6, the projecting inside edges, that is, convex edges 18, or projections 18a, engage the adjacent pintle parts and prevent reverse flexing of the chain, which is thus held in the straight line position. The chain cannot sag or flex in a reverse direction because rolling of the pintle parts upon each other is prevented by the action of the convex edges 18, or projections 18a, in engagement with the adjacent pintle parts.

However, as indicated in Fig. 8, the convex edges 18, or projections 18a, do not interfere with the rolling movement of the pintle parts when the chain flexes to pass around a sprocket. Hence the chain is free to perform its proper function, but is constrained to travel in a straight line between the sprockets by means of the provision of the convex edges in the apertures of the guide links. Although I prefer to employ guide links as described with projections in the apertures for the purposes of the invention, plain links having similar projections can be substituted, such links being inserted in place of the guide links to effect the same result.

From the foregoing, it will be understood that the chain as illustrated and described herein presents advantages over chains as heretofore known and used. The simplicity of the form of the apertures facilitates the operation of the chain and also the manufacture thereof. The guide links 16 may be formed by operations similar to those employed in the manufacture of the other links used in the chain. The assembly of the links can be effected as readily as that of the earlier types of chains, and the improved guide link construction prevents reverse flexing or "whipping" of the chain during the operation thereof.

Various changes may be made in the form and arrangement of the parts without departing from the invention or sacrificing its material advantages.

I claim:

1. In silent chain including, in combination, a plurality of overlapping sets of symmetrical links shaped to engage sprocket teeth and each having apertures which are substantially circular in form except for flattened edges at opposite ends of the links and articulating pintles disposed in the apertures of the overlapping links, each pintle comprising two parts having flat sides to engage the flattened edges of the apertures and opposed convex co-operating surfaces adapted for rolling contact, the improvement consisting of links assembled in the chain and having apertures with projections whose edges are closer to the centers of the apertures than the arcs of the apertures, and are constructed and arranged to engage the pintle parts and to prevent reverse flexing of the chain.

2. In silent chain inluding, in combination, a plurality of overlapping sets of symmetrical links shaped to engage sprocket teeth and each having apertures which are substantially circular in form except for flattened edges at opposite ends of the links and articulating pintles disposed in the apertures of the overlapping links, each pintle comprising two parts having flat sides to engage the flattened edges of the apertures and opposed convex co-operating surfaces adapted for rolling contact, the improvement consisting of links assembled in the chain and having apertures with convex edges constructed and arranged to engage the pintle parts and to prevent reverse flexing of the chain.

3. In silent chain including, in combination, a plurality of overlapping sets of symmetrical links shaped to engage sprocket teeth and each having apertures which are substantially circular in form except for flattened edges at opposite ends of the links and articulating pintles disposed in the apertures of the overlapping links, each pintle comprising two parts having flat sides to engage the flattened edges of the apertures and opposed convex co-operating surfaces adapted for rolling contact, the improvement consisting of guide links assembled medially of the width of the chain and having apertures with projections whose edges are closer to the centers of the apertures than the arcs of the apertures, and are constructed and arranged to engage the pintle parts and to prevent reverse flexing of the chain.

4. In silent chain including, in combination, a plurality of overlapping sets of symmetrical links shaped to engage sprocket teeth and each having apertures which are substantially circular in form except for flattened edges at opposite ends of the links and articulating pintles disposed in the apertures of the overlapping links, each pintle comprising two parts having flat sides to engage the flattened edges of the apertures and opposed convex co-operating surfaces adapted for rolling contact, the improvement consisting of guide links assembled at the lateral edges of the chain and having apertures with projections whose edges are closer to the centers of the apertures than the arcs of the apertures, and are constructed and arranged to engage the pintle parts and to prevent reverse flexing of the chain.

5. In silent chain including, in combination, a plurality of overlapping sets of symmetrical links shaped to engage sprocket teeth and having apertures which are substantially circular in form except for flattened edges at opposite ends of the links and articulating pintles disposed in the apertures of the overlapping links, each pintle comprising two parts having flat sides to engage the flattened edges of the apertures and opposed convex co-operating surfaces adapted for rolling contact, the improvement consisting of guide links assembled medially of the width of the chain and having apertures with convex edges constructed and arranged to engage the pintle parts and to prevent reverse flexing of the chain.

6. In silent chain including, in combination, a plurality of overlapping sets of symmetrical links shaped to engage sprocket teeth and each having apertures which are substantially circular in form except for flattened edges at opposite ends of the links and articulating pintles disposed in the apertures of the overlapping links, each pintle comprising two parts having flat sides to engage the flattened edges of the apertures and opposed convex co-operating surfaces adapted for rolling contact, the improvement consisting of guide links assembled at the lateral edges of the chain and having apertures with convex edges constructed and arranged to engage the pintle parts and to prevent reverse flexing of the chain.

THOMAS F. MACARTHUR.

References Cited in the file of this patent

UNITED STATES PATENTS

| Number | Name | Date |
|---|---|---|
| 1,661,074 | Johnson et al. | Feb. 28, 1928 |
| 1,691,871 | Reeves | Nov. 13, 1928 |
| 1,743,500 | Sturtevant | Jan. 14, 1930 |
| 2,067,243 | Perry | Jan. 12, 1937 |